United States Patent Office 3,485,602
Patented Dec. 23, 1969

---

3,485,602
GASOLINE ANTI-ICING
Warren L. Perilstein, Orchard Lake, Mich., assignor to Ethyl Corporation, New York, N.Y., a corporation of Virginia
No Drawing. Filed Apr. 7, 1967, Ser. No. 629,087
Int. Cl. C10l 1/22
U.S. Cl. 44—63                                8 Claims

ABSTRACT OF THE DISCLOSURE

Gasoline containing, as an anti-icing additive, the amine salt of a formaldehyde modified unsaturated organic acid. An example of such an additive is the N-oleyl-1,3-propylenediamine salt of the Prins reaction product of formaldehyde and oleic acid. The Prins reaction involves the complex addition of the elements of formaldehyde across a carbon-to-carbon double bond.

BACKGROUND OF THE INVENTION

The tendency of gasoline fuel internal combustion engines to stall due to carburetor icing is well known. This stalling contributes to reducing the overall efficiency of engine operation. Where the engine powers an automobile it may also be a safety hazard.

Gasoline additives which will reduce this tendency of the carburetor to ice are available. New and improved additives, however, are always in demand.

SUMMARY OF THE INVENTION

This invention relates to gasoline having improved anti-icing characteristics containing an amine salt of a formaldehyde modified unsaturated organic acid. It further relates to a method of reducing the stalling due to ice formation in the carburetor of a gasoline fueled internal combustion engine. It also relates to a formaldehyde modified unsaturated acid/amine salt as a new gasoline additive.

DESCRIPTION OF THE PREFERRED EMBODIMENT

An object of this invention is to provide a gasoline composition with improved anti-icing characteristics. Another object of this invention is to provide a new gasoline additive anti-icing composition. These and other objects of this invention will be made apparent from the following description and claims.

An embodiment of this invention is a gasoline containing as an anti-icing additive a salt of (a) a formaldehyde modified unsaturated organic acid, said unsaturated acid having from 10 to about 20 carbon atoms and
(b) an amine having the formula

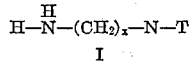

I wherein T is selected from alkyl and alkenyl radicals having up to 20 carbon atoms and $x$ is an integer from 1 to about 6.

Another embodiment of this invention is the gasoline described above wherein the concentration of said salt is from about 10 to about 50 parts per million, by weight.

Preferred embodiments of this invention are gasolines described above wherein the additive is a salt of a formaldehyde modified unsaturated acid, said unsaturated acid having from about 16 to about 18 carbon atoms and an amine (Formula I) wherein $x$ is 2 tor 3 and T is about a $C_{12}$ to about a $C_{18}$ alkyl or alkenyl radical.

Especially preferred embodiments are the preferred gasolines described above wherein said amine (Formula I) is a substituted 1,3-propylene diamine ($x=3$) where T is an alkenyl radical having from about 16 to about 18 carbon atoms.

The acids which are used to prepare the salts used in the present invention are unsaturated organic acids which are reacted with formaldehyde under acid conditions. They are conveniently described in this application as formaldehyde modified unsaturated acids. This formaldehyde/acid reaction is characterized by the addition of the elements of formaldehyde across the carbon-to-carbon double bond of the acid; the product thus obtained is a mixture of various addition products; the acid function, however, is not affected. The addition of elements of formaldehyde across carbon-to-carbon double bonds is commonly referred to as the Prins reaction.

Regarding this Prins reaction with an unsaturated organic acid, no definitive analysis of the products obtained appears to be available at this time. According to present knowledge, the following products are most likely to be formed when for example, oleic acid is modified via the Prins reaction with formaldehyde.

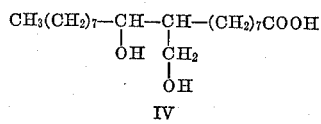

IV

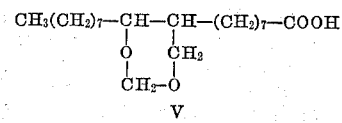

V

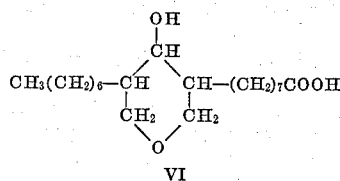

VI

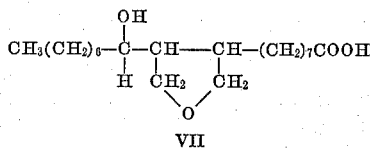

VII

A thorough discussion of the Prins reaction on an unsaturated acid is found in the Journal of the American Oil Chemists Society, 43, pp. 161–164 (1965).

Generally, this reaction of unsaturated acid with formaldehyde is carried out in acetic acid solution with a strong acid, such as sulfuric acid, as the catalyst at a temperature in the region of about 50° to 115° C. A typical procedure is presented below in Example 1. When acetic acid is the solvent, the product is also found to contain the acetate esters of the hydroxy compounds illustrated by Formulas IV–VII and the like.

Thus, the formaldehyde modified unsaturated acids used in the present invention are obtained from the addition of formaldehyde via the Prins reaction as described above.

Useful acids which are formaldehyde modified are unsaturated carboxylic acids having 10 to about 20 carbon atoms. These unsaturated acids include acids having one double bond such as $\Delta^{9,10}$-decenoic acid, cetoleic acid and the like; as well as acids having more than one double bond such as linoleic acid, eleostearic acid, arachidonic acid and the like. Preferred unsaturated acids are those having from 16 to about 20 carbon atoms. Examples of the preferred acids are gadoleic acid, linoleic acid, palmitoleic acid, and the like. Oleic acid is a most preferred acid.

The preferred acids are commonly obtained as hydrolysis products of natural materials. The acids so obtained are usually mixtures containing other organic acids. Thus, for example, acids obtained from olive oil are typically a mixture of 83% oleic acid, 6% palmitic acid, 4% stearic acid and 7% linoleic acid. This mixture is quite suitable for preparing the formaldehyde modified acids used in this invention. In addition, the organic acid mixtures obtained on saponifying and acidulating babassu oil, castor oil, tall oil, peanut oil, palm oil and the like are also useful. Those organic acid mixtures which contain a significant proportion of oleic acid are especially useful.

Amines which are used to prepare the salts used in this invention are alkylene amines illustrated by Formula I. These amines are characterized by having at least one primary amine group in the molecule. These amines include unsubstituted amines, that is amines wherein T in Formula I above is hydrogen. Examples of useful unsubstituted amines are ethylene diamine, 1,12-diaminododecane, hexamethylene diamine and the like. These amines also include the substituted amines wherein T in Formula I above is selected from 2-aminoethyl, 2-hydroxyethyl and alkyl or alkenyl groups having up to 20 carbon atoms. Examples of the useful substituted amines are N-gadoleyl ethylene diamine, N-dodecyl-1,3-propylene diamine, and the like. Preferred amines are those in which T (Formula I) is selected from alkyl or alkenyl groups (and mixtures thereof) having from about 12 to about 18 carbon atoms. Examples of these preferred amines are N - palmitoleyl - 1,6 - hexamethylene diamine, N-lauryl-1,3-propylene diamine, N-stearyl ethylene diamine, N-linoleyl-1,3-propylene diamine, N-stearyl-1,4-butylene diamine and the like. A most preferred amine is N-oleyl-1,3-propylene diamine.

The salts of the formaldehyde modified acids and amines described above are simply prepared by mixing the modified acid and the amine in the desired molar ratios at room temperature. The composition of the salt will depend on the number of moles of each of the ingredients which are added. Thus, for example, salts of formaldehyde modified palmitoleic acid and ethylene diamine can be prepared where the molar ratio of the modified acid to the amine can range from 1:1 to 2:1. In other words, the maximum molar ratio of modified acid to amine which can be used is equal to the total number of basic nitrogen atoms in the amine molecule. Useful salts include those in which the molar ratio of modified acid to amine ranges from 1:1 up to about 2:1. The preferred salts are those prepared from the modified acids and amines described above wherein the molar ratio of acid to amine is about 2:1.

Especially preferred salts are the salt of two moles of the formaldehyde modified oleic acid and one mole N-oleyl-1,3-propylenediamine and the salt of two moles of formaldehyde modified tall oil fatty acids and one mole of N-oleyl-1,3-propylenediamine.

The preparation of a formaldehyde modified unsaturated acid and its amine salt are presented in the following examples. All parts are by weight unless otherwise indicated.

Example 1

Preparation of formaldehyde modified unsaturated fatty acid.—A vessel fitted with a stirrer, a thermometer, a condenser and a dropping funnel was charged with 95 paraformaldehyde, 269 parts of (glacial) acetic acid, and 17.6 parts of concentrated sulfuric acid. The ingredients were stirred and heated to 110° C. to dissolve the paraformaldehyde. The reaction mixture was then cooled to 88° C. 197.3 parts of a commercial tall oil fatty acid (approximately 51% oleic acid, 47% mixed linoleic acid and 2% saturated acids) were continuously added via the dropping funnel into the stirred mixture over a period of 51 minutes. During this time the temperature rose to a maximum of 96° C. The temperature when the addition of the acid was complete was 92° C. The mixture was then stirred for an additional two hours at a temperature from about 90° C. to about 100° C. The mixture was then cooled and about 100 grams of benzene were added to the vessel. This mixture was then stirred briefly and poured into a separatory funnel. The reaction vessel was washed out with about 35 parts of benzene. The washings were added to the separatory funnel along with an additional 150 parts of benzene. The contents of the separatory funnel were washed eight times using 200 parts of water each time. This washed product was dried over sodium sulphate for about 12 hours. The dried material was filtered and the solvent stripped under vacuum. The yield of formaldehyde-tall oil fatty acid product obtained was 273 parts. This product had an Acid Number of 128 mg. of KOH/g., a Saponification Number of 244.7 mg. KOH/g. and an Iodine Number of 6.8.

Example 2

Amine salt of formaldehyde modified unsaturated organic acid.—Six parts of the formaldehyde tall oil fatty acid product of Example 1 was weighed into a small vessel. 2.42 parts of N-oleyl-1,3-propylene diamine (Duomeen-O having a base numbre of 316 mg. KOH/g.) was added to this acid. The ingredients were then stirred thoroughly. 8.42 parts of the oleyl-1,3-propylene diamine salt of the Example 1 product was otbained. Duomeen-O is the trade name for Armour's oleyl-1,3-propylene diamine.

The procedure of Example 1 is suitable for formaldehyde modifying any of the unsaturated acids described above. In a similar manner, the salt of any of the formaldehyde acids can be prepared in the manner described in Example 2.

The procedures given in Example 1 and 2 illustrate a typical method of preparing the salts of this invention. It is not intended that preparation of the modified acids and their amine salts be limited by these procedures. Other methods of preparation known to those skilled in the art can also be used.

Another embodiment of this invention is an additive concentrate which comprises a solution of amine salts described above. This solution is prepared by simply adding the amine salt in the desired concentration to a suitable solvent. Solvents which are useful are aromatic hydrocarbons such as toluene, xylene and the like; paraffinic hydrocarbons such as hexane, dodecane, pentadecane and the like; alcohols such as 2-ethylhexanol, pentanol, isopropanol, ethanol and the like. Commercial mixtures of solvents such as Stoddard solvent are also useful.

The amount of the amine salt in the additive concentrate may be varied. A suitable concentrate contains from about 10 to about 85 percent by weight of the amine salt.

The ratio concentration of the amine salt in the concentrate is not critical.

Any gasoline suitable for use in internal combustion engines may be used in the practice of this invention. By gasoline is meant a blend of hydrocarbons boiling from about 80° F. to about 440° F. which occur naturally in petroleum and suitable hydrocarbons made by thermal or catalytic cracking or reforming of petroleum hydrocarbons. Typical base gasolines are listed in Table I.

TABLE I.—BASE GASOLINES

| | A | B | C | D |
|---|---|---|---|---|
| Gravity, ° API | 59.9 | 56.6 | 62.0 | 39.7 |
| Reik Vapor Pressure, p.s.i | 9.0 | 11.2 | 10.7 | 10.2 |
| Sulfur, percent | .013 | .007 | .054 | .050 |
| Aromatics, percent | 27.0 | 34.5 | 19.0 | 24.0 |
| Olefins, percent | 11.0 | 8.0 | 18.5 | 12.5 |
| Saturates, percent | 62.0 | 57.5 | 62.5 | 63.5 |
| ASTM Distillation, ° F.: | | | | |
| Initial B.P | 100 | 89 | 90 | 88 |
| 10% evap | 128 | 116 | 115 | 116 |
| 30% evap | 166 | 117 | 155 | 165 |
| 50% evap | 210 | 230 | 199 | 218 |
| 70% evap | 250 | 282 | 254 | 274 |
| 90% evap | 310 | 338 | 349 | 355 |
| End point | 396 | 410 | 420 | 432 |

Useful concentrations of the amine salts in gasolines of this invention are up to about 200 p.p.m. by weight, with 10 to about 100 p.p.m. preferred.

In preparing the improved gasolines of the present invention, the amine salt may be conveniently added as a concentrate described above. The gasoline compositions can also be prepared by simply adding the amine salt directly to the gasoline. Conventional gasoline blending procedures and apparatus can be used.

The improved anti-icing characteristics of the gasoline compositions of this invention were determined by using an automobile engine test. Briefly, the procedure consists of cycling an automobile engine with no load between medium and low speeds using cold moist carburetor intake air. When a sufficient amount of ice forms in the carburetor throttle plate and idle passages, stalling occurs during the low speed portion of the cycle. After the stall, the engine is immediately restarted on the medium speed portion of the cycle. Warm up of the engine is simulated by applying external heat to a specific section below the carburetor. The criterion for evaluating the icing tendency of a fuel is the number of stalls which occur before the warm up is accomplished. The data is reported as percent reduction in stalls using gasoline containing the additive as compared with gasoline containing no anti-icing additive. Following is a table presenting the anti-icing data for the gasoline fuels of this invention.

TABLE II.—ANTI-ICING

| Run | Gasoline containing | Amount (p.p.m.)[1] | Reduction in stalling (percent) |
|---|---|---|---|
| 1 | Salt of Example 2 | 25 | 38 |
| 2 | do | 50 | 58 |
| 3 | MPA-85 [2] | 29 | 57 |

[1] By weight.
[2] Ethyl Corporation multi-purpose gasoline additive.

The data in Table II illustrates the anti-icing effectiveness of the additive of this invention. The amine salt additive reduces the stalling by 38% (Run 1) at a concentration of 25 parts per million. At a concentration of 50 parts per million, the stalling is reduced by 58% (Run 2). This is camparable to the reduction in stalling obtained using MPA-85 (Run 3) a detergent/anti-icer marketed by the Ethyl Corporation.

Similar anti-icing results are obtained when the following amine salts are used in gasoline.

| Salt of— | | Concentration in gasoline (p.p.m.)[2] |
|---|---|---|
| Acid [1] (moles) | Amine (moles) | |
| Δ⁹,¹⁰-dodecenoic acid (1.0) | N-palmitylhexamethylene diamine (1.0). | 8 |
| Tall oil acids (2.0) | N-(2-hydroxyethyl)-ethylene diamine (1.0). | 100 |
| Gadoleic acid (2.1) | 1,4-butylene diamine (1.0). | 15 |
| Linolenic acid (1.5) | 1,3-propylene diamine (1.0). | 200 |
| Palm oil acid [3] (1.0) | N-myristyl-1,3-propylene diamine (1.0). | 10 |
| Soybean oil acids [3] (2.0) | N-palmitoleyl-1,3-propylene diamine (1.0). | 75 |
| Cotton seed oil acids [3] (2.0). | N-stearylethylene diamine (1.0). | 50 |

[1] Acid is formaldehyde modified (as described herein) before making the salt.
[2] By weight.
[3] Typical acid composition is given in "Vegetable Fats and Oils" by E. W. Eckey (1954), Reinhold Publishing Co., New York.

The gasoline composition and additive concentrates of this invention may also contain other commonly used gasoline additives. Examples of other additives are anti-knock agents such as tetraethyllead, tetramethyllead, methylcyclopentadienyl manganese tricarbonyl and the like; scavengers such as ethylene bromide, ethylene chloride and the like; antioxidants such as hindered phenols and aromatic amines; lead appreciators such as tert-butyl-acetate and the like; corrosion inhibitors such as linoleic acid dimer and the like; and anti-wear additives such as dibutylphthalate and the like; and dyes.

The gasoline compositions and gasoline additive mixtures of the present invention are fully described above. It is intended that the invention herein described be limited only within the lawful scope of the above disclosure and the claims which follow.

I claim:
1. A gasoline containing as an anti-icing amount salt of
(a) a Prins reaction product of formaldehyde and an unsaturated organic acid, said unsaturated carboxylic acid having from 10 to about 20 carbon atoms and
(b) an amine having the formula

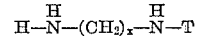

wherein T is selected from alkyl and alkenyl radicals having up to about 20 carbon atoms and $x$ is an integer from 1 to about 6.

2. A gasoline of claim 1 wherein the concentration of said salt is from about 10 to about 50 parts per million by weight.

3. A gasoline of claim 1 wherein said unsaturated acid has from about 16 to about 18 carbon atoms and wherein $x$ is 3 and T is an alkenyl radical having from 16 to about 18 carbon atoms.

4. The gasoline of claim 1 containing up to 200 parts per million by weight of said salt.

5. The gasoline of claim 4 wherein said acid is tall oil fatty acid and said amine is N-oleyl-1,3-propylene diamine.

6. The gasoline of claim 5 containing from 25–50 parts per million by weight of said salt.

7. An additive concentrate solution containing from 10 percent to about 80 percent by weight of the salt of claim 1.

8. An additive concentrate solution containing from 10 percent to about 80 percent by weight of the salt of claim 5.

References Cited

UNITED STATES PATENTS 2,867,515  1/1959  Andress _____ 44—66
2,996,366  8/1961  Churchill et al. _____ 44—66

PATRICK P. GARVIN, Primary Examiner

Y. H. SMITH, Assistant Examiner

U.S. Cl. X.R.

44—16, 70